United States Patent
Park et al.

(10) Patent No.: US 6,751,273 B1
(45) Date of Patent: Jun. 15, 2004

(54) APPARATUS FOR COMPENSATING A CHANNEL DISTORTION IN A BLUETOOTH SYSTEM

(75) Inventors: Cheol-Hee Park, Seoul (KR); Jong Ho Paik, Pyungtaek-si (KR); Young Hwan You, Seoul (KR); Min-Chul Ju, Pyungtaek-si (KR); Jin-Woong Cho, Pyungtaek-si (KR)

(73) Assignee: Korea Electronics Technology Institute, Pyungtaek-si (KR)

( * ) Notice: Subject to any disclaimer, the term of this patent is extended or adjusted under 35 U.S.C. 154(b) by 755 days.

(21) Appl. No.: 09/643,086

(22) Filed: Aug. 21, 2000

(30) Foreign Application Priority Data

May 3, 2000 (KR) .................................. 2000-0023810

(51) Int. Cl.⁷ .......................... H04B 1/10; H04B 1/713; H04L 1/00; H04L 27/14
(52) U.S. Cl. ....................... 375/346; 375/134; 375/334; 375/340
(58) Field of Search ................................ 375/334, 336, 375/340, 346, 132, 134, 272, 274

(56) References Cited

U.S. PATENT DOCUMENTS 5,164,959 A * 11/1992 Cai et al. .................... 375/150
6,587,500 B1 * 7/2003 Persson et al. ............. 375/142

OTHER PUBLICATIONS

Franzer Bennett, David Clarke, Joseph B. Evans, Andy Hopper, Alan Jones and David Leask, "Piconet: Embedded Mobile Networking" IEEE Personal Communications, Oct. 1997, pp. 8–15.

Per Johansson, Niklas Johansson, Ulf Körner, Johannes Elg and Göran Svennarp, "Short Range Radio Based Ad–hoc Networking: Performance and Properties" IEEE, 1999, pp. 1414–1420.

Adel A. M. Saleh and Reinaldo A. Valenzuela, "A Statistical Model for Indoor Multipath Propagation" IEEE Journal on Selected Areas in Communications, Feb. 1987, vol. Sac–5, No. 2, pp 128–137.

* cited by examiner

Primary Examiner—Stephen Chin
Assistant Examiner—David B. Lugo
(74) Attorney, Agent, or Firm—Katten Muchin Zavis Rosenman

(57) ABSTRACT

An apparatus for compensating a channel distortion in a Bluetooth system to process a received signal having access codes comprises a multiplier for multiplying the received signal by a previously obtained channel distortion compensation signal to thereby provide a multiplied signal; a demodulator for demodulating access codes of the multiplied signal to thereby output demodulated received access codes as a demodulated signal; a correlation detection circuit for detecting correlation values between the demodulated received access codes and the access codes of the received signal previously stored therein to detect a start point of the received signal, thereby providing detected access codes having corresponding correlation values greater than a predetermined threshold and providing an enable signal if there are one or more correlation values greater than the predetermined threshold; and a channel distortion compensation circuit for performing a channel distortion compensation based on the detected access codes and a reference signal obtained by re-modulating the access codes of the received signal in response to the enable signal to thereby provide a channel distortion compensation signal.

6 Claims, 6 Drawing Sheets

APPARATUS FOR COMPENSATING A CHANNEL DISTORTION IN A BLUETOOTH SYSTEM

FIELD OF THE INVENTION

The present invention relates to a Bluetooth system; and more particularly, to an apparatus for compensating a channel distortion for use in a Bluetooth system.

BACKGROUND OF THE INVENTION

Recently, with the rapid advent of information age accompanied with fast development of various communication technologies, industries have taken strong interests in wireless personal area networks (WPAN) such as the so-called Bluetooth and shared wireless access protocol (SWAP). In particular, the Bluetooth system is focused on a low cost, simple hardware and robustness facilitating protected ad-hoc connections for stationary and mobile communication environments.

The Bluetooth system has three main application areas: a wire replacement, a local area network (LAN) access point and a personal area network. In the so-called Bluetooth ad-hoc network or piconet, data is conveyed in a packet having access codes, a header and a payload. There are two link types: a synchronous connection-oriented (SCO) link and an asynchronous connection-less (ACL) link. The SCO link is a point-to-point link between a master and a single slave. The ACL link is a point-to-multipoint link between a master and slaves in a piconet.

The Bluetooth system usually adopts a slotted time division duplex (TDD) scheme for full duplex transmission, wherein in this case, a length of each slot is 625 µs and two slots form one frame. A fast frequency hopping scheme of 1600 hops/s and a short data packet format are used for robustness in a noisy and interference environment. Also, a forward error correction (FEC) and an automatic repeat request (ARQ) are used as error correction schemes. The purpose of a FEC scheme on a data payload is to reduce the number of retransmission for improving throughput thereof. The data transmitted has a gross bit rate of 1 Mbit/sec.

A Gaussian-shaped frequency shift keying (GFSK) modulation is applied to minimize a transceiver complexity thereof. The nominal and supported range of the Bluetooth system is from 10 cm to 10 m; but the range can be extended to 100 m with an external power amplifier. A binary GFSK with modulation index between 0.28 and 0.35 is employed for a simple and small transceiver implementation.

FIG. 1 shows a block diagram of a GFSK transmitter for use in a conventional Bluetooth system. The GFSK transmitter includes a Bluetooth link controller 11, a packet generator 13, a Gaussian low pass filter (LPF) 15, an integrator 17 and a modulator 19. The packet generator 13 generates a packet signal under the control of the Bluetooth link controller 11. The Gaussian LPF 15 filters the packet signal to thereby provide a filtered signal g(t). Then, the integrator 17 performs integration on the filtered signal g(t) to thereby feed an integrated signal. The modulator 19 modulates the integrated signal to thereby generate a GFSK signal p(k). A binary. GFSK with modulation index between 0.23 and 0.35 is employed for a simple and small transceiver implementation.

In the above, the p(t) can be written as:

$$p(t) = \text{Re}\left\{\sqrt{\frac{2E}{T}} e^{j2\pi\{f_c t + h \int_{-\infty}^{t} g(\tau)d\tau\}}\right\}$$

wherein E is an energy per a symbol; T is a symbol period; $f_c$ is a carrier frequency; h is a modulation index; and g(t) is the output of the Gaussian LPF 15. The g(t) can be expressed as:

$$g(t) = \sum_{k=-\infty}^{\infty} a_k v(t - kT)$$

wherein $a_k = \pm 1$; and $$v(t) = \frac{1}{2}\{erf(-\lambda B_b T) + erf(\lambda B_b(t + T))\}, \lambda = \sqrt{\frac{2}{\ln 2\pi}},$$

$B_b T = 0.5$, $B_b$ being a 3 dB bandwidth of GLPF and $$erf(t) = \int_0^t \frac{2}{\sqrt{\pi}} e^{-t^2} dt.$$

Meanwhile, in the conventional Bluetooth system employed in an indoor environment such as home, office or airport, it is assumed that a statistical channel modeling for the Bluetooth system is performed as a multi-path channel model; and received signals form groups of clusters. A low-pass equivalent channel impulse response can be given $$c(t) = \sum_{l=0}^{\infty} \sum_{k=0}^{\infty} \gamma_{kl} e^{j\theta_{kl}} \delta(t - T_l - \tau_{kl})$$

wherein $T_l$ is an arrival time of an l-th cluster; $\tau_{kl}$ is an arrival time of a k-th ray measured from the beginning of the l-st cluster; $\theta_{kl}$ is a phage shift; and $\gamma_{kl}$ is a power gain of the k-th ray in the l-st cluster. It is assumed that the Bluetooth system operates in the indoor environment with an rms delay spread of 50 ns, a maximum delay spread of 300 ns and Doppler spread of 10 Hz. The modulated GFSK signal is transmitted at a 1 Mbit/s rate in 625 µs slot size, which makes the channel to be fixed within a slot.

FIG. 2 depicts a conventional channel modeling of the Bluetooth system. A received GFSK signal s(t) which has been changed while passing the transmission channel, as shown in FIG. 2, can be given by:

$$s(t) = m(t)c(t) + n(t) = \sqrt{\frac{2E}{T}} C(t)e^{j(\phi(t,\alpha)+\phi_c(t))} + N(t)e^{j\phi_n(t)}$$

$$= \sqrt{A^2(t) + B^2(t)} \; e^{j\tan^{-1}\frac{B(t)}{A(t)}}$$

wherein $c(t) = C(t)e^{j\phi_c(t)}$ is a component of the channel distortion;
$n(t) = N(t)e^{j\phi_m(t)}$ is an additive white Gaussian noise (AWGN);

$$\phi(t,\overline{\alpha}) = 2\pi h \int \infty g(\tau) d\tau;$$

$$m(t) = \sqrt{\frac{2E}{T}} e^{j\phi(t,\overline{\alpha})}$$

is an equivalent complex envelope of p(t); and $$A(t) = \left\{ \sqrt{\frac{2E}{T}} C(t)\cos(\phi(t,\overline{\alpha}) + \phi(t)) + N(t)\cos(\phi_n(t)) \right\},$$

$$B(t) = \left\{ \sqrt{\frac{2E}{T}} C(t)\sin(\phi(t,\overline{\alpha}) + \phi(t)) + N(t)\sin(\phi_n(t)) \right\}.$$

A GFSK modulation system usually uses an FM discriminator. FIG. 3 represents a structure of a conventional GFSK modulator 300. The GFSK modulator 300 includes a hard limiter 310, an FM discriminator 320 and an LPF 330. The hard discriminator 310 compensates an amplitude of the received signal s(t). The FM discriminator 320 detects a phase of the compensated s(t) to thereby extract desired information. The following terms $S_c$ (t) and $\phi$(t) are related to the desired information, which can be expressed by the following equations:

$$S_c(t) = \frac{s(t)}{|s(t)|} e^{j\tan^{-1}\frac{B(t)}{A(t)}},$$

$$\varphi(t) = \frac{d\left\{\tan^{-1}\frac{B(t)}{A(t)}\right\}}{dt}$$

$$= \frac{1}{1+\left(\frac{B(t)}{A(t)}\right)^2} \frac{B'(t)A(t) - B(t)A'(t)}{A^2(t)}.$$

Referring to the above equations for the $S_c$ (t) and $\phi$(t), it can be understood that a demodulated GFSK signal may be distorted by the channel. In other words, the distortion of the phase and amplitude of a signal transmitted through a channel deteriorates the performance of the demodulator. Further, in the conventional Bluetooth system employed in an indoor environment such as home, office or airport, the distortion of the phase and amplitude of a transmitted signal through a channel can be severely deteriorated due to the reflection, refraction, diffraction or dispersion therein. Accordingly, it is necessary to prepare a channel distortion compensation apparatus in the Bluetooth system.

In a conventional apparatus for compensating the channel distortion in the Bluetooth system, the information for the channel is needed. A pilot signal or a training signal is employed to offer the information for the channel. But, in this case, a structure of a transmitter affects the information for the channel to thereby entail the complexity of the receiving end. In the case that the pilot signal is used, the channel information can be obtained by estimating the pilot signal passed through the channel, wherein a signal having a frequency are transmitted from the sending end to the receiving end.

To use a channel compensation scheme employing a pilot signal or a training signal, a structure of a receiver should be constructed to provide information therefor. But, the structure of the receiver is limited since the structure is generally predetermined with a preset specification. Further, when a pilot signal is used, since a pilot signal should be transmitted with a preset frequency, the efficiency thereof is deteriorated. When a training signal is used, since a training signal should be included in a packet signal to be transmitted, the efficiency thereof is deteriorated. In particular, in a commercial Bluetooth system, since a pilot signal or a training signal is not used due to a power consumption problem, synchronization detection is impossible.

SUMMARY OF THE INVENTION

It is, therefore, an object of the present invention to provide an apparatus for compensating a channel distortion by employing access codes for use in a Bluetooth system.

In accordance with the present invention, there is provided an apparatus for compensating a channel distortion in a Bluetooth system to process a received signal having access codes, comprising:

means for multiplying the received signal by a previously obtained channel distortion compensation signal to thereby provide a multiplied signal;

means for demodulating access codes of the multiplied signal to thereby output demodulated received access codes as a demodulated signal;

means for detecting correlation values between the demodulated received access codes and the access codes of the received signal previously stored therein to detect a start point of the received signal, thereby providing detected access codes having corresponding correlation values greater than a predetermined threshold and providing an enable signal if there are one or more correlation values greater than the predetermined threshold; and means, in response to the enable signal, for performing a channel distortion compensation based on the detected access codes and a reference signal obtained by re-modulating the access codes of the received signal to thereby provide a channel distortion compensation signal.

BRIEF DESCRIPTION OF THE DRAWINGS

The above and other objects and features of the present invention will become apparent from the following description of preferred embodiments given with reference to the accompanying drawings, in which.

DETAILED DESCRIPTION OF THE PREFERRED EMBODIMENTS

Referring to FIGS. 4–10, preferred embodiments of the present invention will be described hereinafter. A master device in a Bluetooth network can communicate with a plurality of slave devices. In other words, the master device knows all the addresses of Bluetooth devices (slaves) connected in the network, wherein the slaves obtain the address of the master device through the forming procedure of the network. An access code is used for the communications between the master device and the slave devices.

Figure 1:
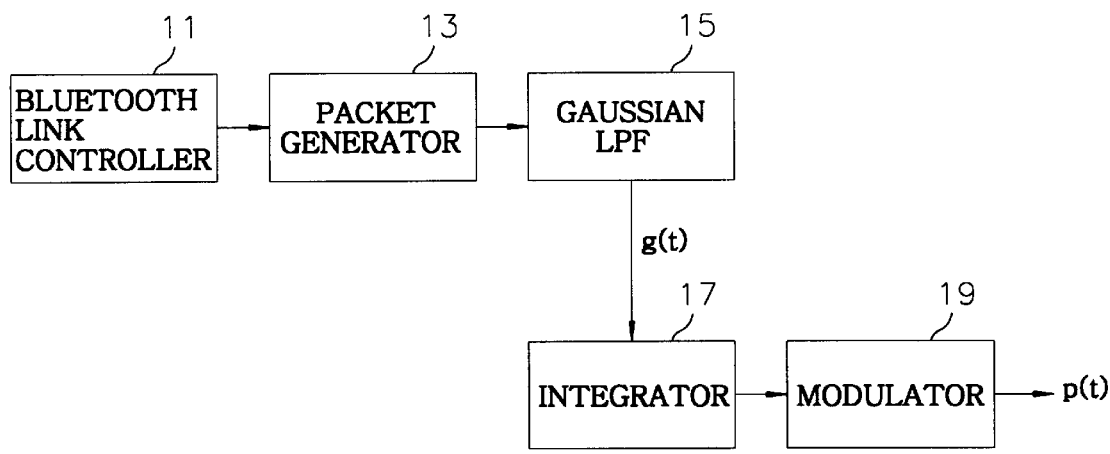
FIG. 1 shows a block diagram of a GFSK transmitter for use in a conventional Bluetooth system.
Figure 2:
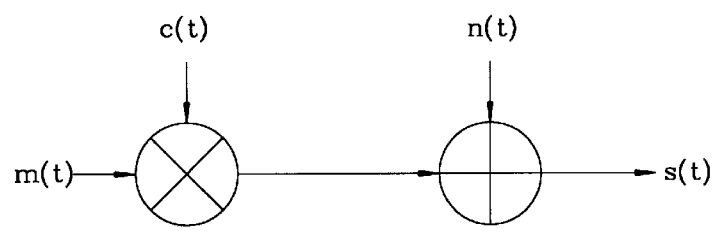
FIG. 2 depicts a conventional channel modeling of the Bluetooth system.
Figure 3:
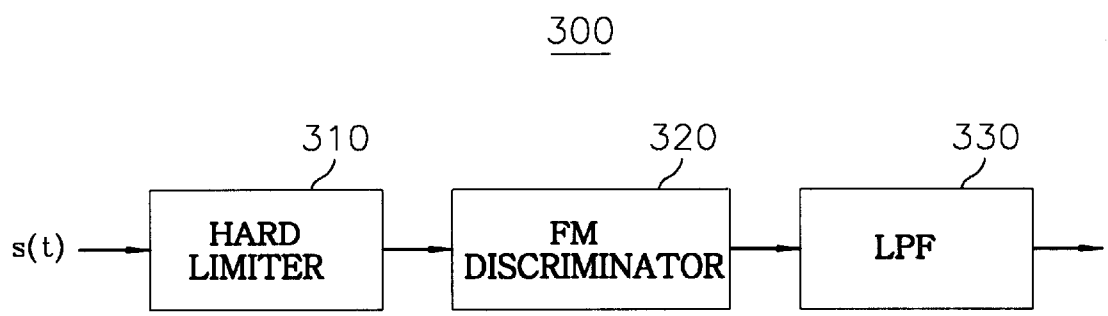
FIG. 3 illustrates a structure of a conventional GFSK modulator.
Figure 4:
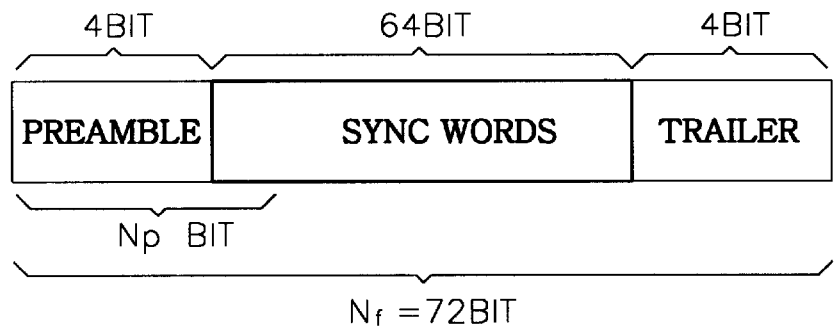
FIG. 4 represents an access code format for use in the present invention.

FIG. 4 represents an access code format for use in the present invention. As represented in FIG. 4, the access codes include 72 bits $N_f$. The access codes are used for the identification of a packet and synchronization of time between the master and the slaves. In the access codes, a channel access code (CAC), a device access code (DAC) and a general access code (GAC) are used.

The CAC is generated by employing information on 28 bits low address part (LAP). Further, the GAC and DAC are used before the network carries out a connection mode. A predetermined code is assigned on the GAC in specification. A predetermined code is also assigned on the DAC by employing inherent values of the devices. Accordingly, the master device and the slave devices in the Bluetooth network can find out access code information for all packets transmitted in the network.

Figure 5:
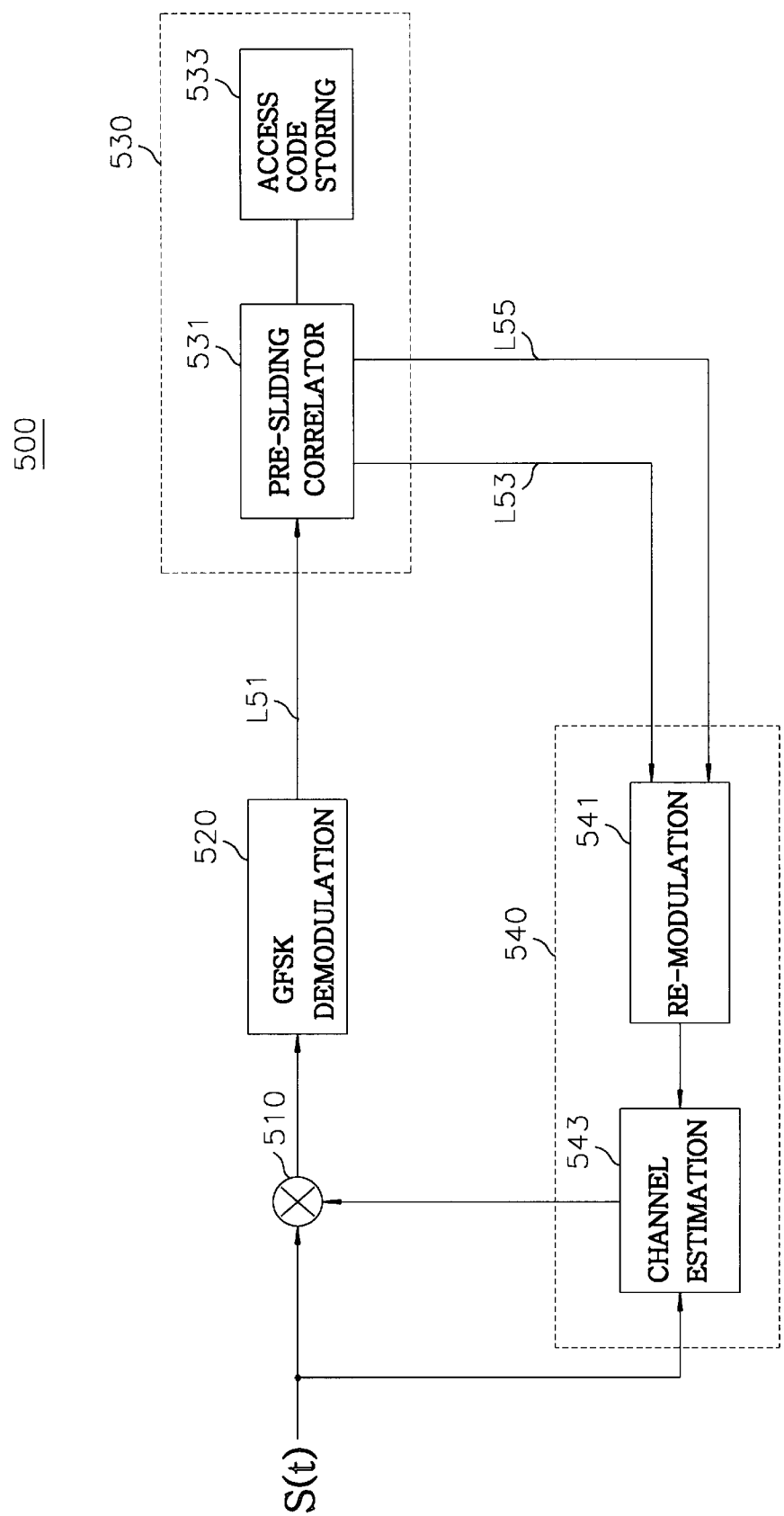
FIG. 5 shows a channel compensation apparatus in accordance with a preferred embodiment of the present invention.

FIG. 5 shows a channel compensation apparatus 500 in accordance with a preferred embodiment of the present invention. The channel compensation apparatus 500 comprises a multiplier 510, a GFSK demodulation circuit 520, a correlation detection circuit 530 and a channel distortion compensation circuit 540. The correlation detection circuit 530 includes a pre-sliding correlator 531 and an access code storing circuit 533. The channel distortion compensation circuit 540 includes a re-modulation circuit 541 and a channel estimation circuit 543.

In the channel compensation apparatus 500, a received signal, e.g., a GFSK signal S(t) having a plurality of access codes is inputted to the multiplier 510 and the channel estimator 543. The multiplier 510 multiplies the received signal by a previously obtained channel distortion compensation signal to thereby provide a multiplied signal to the GFSK demodulation circuit 520, wherein the previous channel distortion compensation signal is 1 at an initialization step.

The demodulation circuit 520 demodulates access codes of the multiplied signal to thereby output demodulated received access codes as a demodulated signal. The demodulated signal is fed to the pre-sliding correlator 531 in the correlation detection circuit 530 through a line L51. The correlation detection circuit 530 detects correlation values between the demodulated received access codes and the access codes of the received signal previously stored therein to detect a start point of the received signal, thereby providing detected access codes having corresponding correlation values greater than a predetermined threshold and providing an enable signal if there are one or more correlation values greater than the predetermined threshold.

Figure 6:
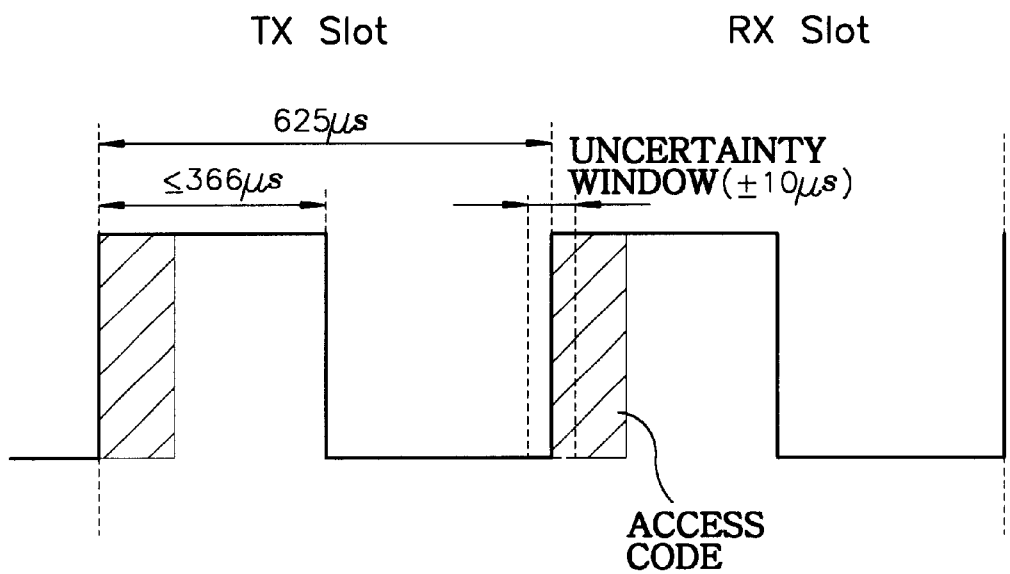
FIG. 6 depicts an uncertainty region in a slot of a receiving mode for use in the Bluetooth system.

In detail, the pre-sliding correlator 531 in the correlation detection circuit 530 uses $N_p$ number of the demodulated received access codes among $N_f$ number of the demodulated received access codes to detect a receiving time of the received signal, $N_p$ being less than $N_f$. The pre-sliding correlator 531 detects correlation values between demodulated received access codes corresponding to a certain uncertainty region, e.g., as depicted in FIG. 6, of the received access codes and the access codes of the received signal previously stored in the access code storing circuit 533.

If there is no correlation value grater than a predetermined threshold, the correlation detection circuit 530 does not operate; if there are one or more correlation values greater than the predetermined threshold, the correlation detection circuit 530 synchronizes with the detected access codes having corresponding correlation values greater than the predetermined threshold and accordingly provides an enable signal and the detected access codes to the re-modulation circuit 541 in the channel distortion compensation circuit 540 via lines L53 and L55, respectively. It should be noted that the access codes of the received signal stored in the access code storing circuit 533 can also be fed to the re-modulation circuit 541 through the line L55.

The channel distortion compensation circuit 540, in response to the enable signal, performs a channel distortion compensation based on the detected access codes and a reference signal obtained by re-modulating previously known access codes, i.e., the access codes of the received signal stored therein or the access codes inputted thereto from the access code storing circuit 533, thereby providing a channel distortion compensation signal to the multiplier 510.

In detail, the re-modulation circuit 541, in response to the enable signal, re-modulates previously known access codes to thereby provide re-modulated access codes as a reference signal to the channel estimation circuit 543. The channel estimation circuit 543 carries out channel estimation based on the received signal S(t) and the reference signal from the re-modulation circuit 541 to thereby provide the channel distortion compensation signal to the multiplier 510.

Figure 7:
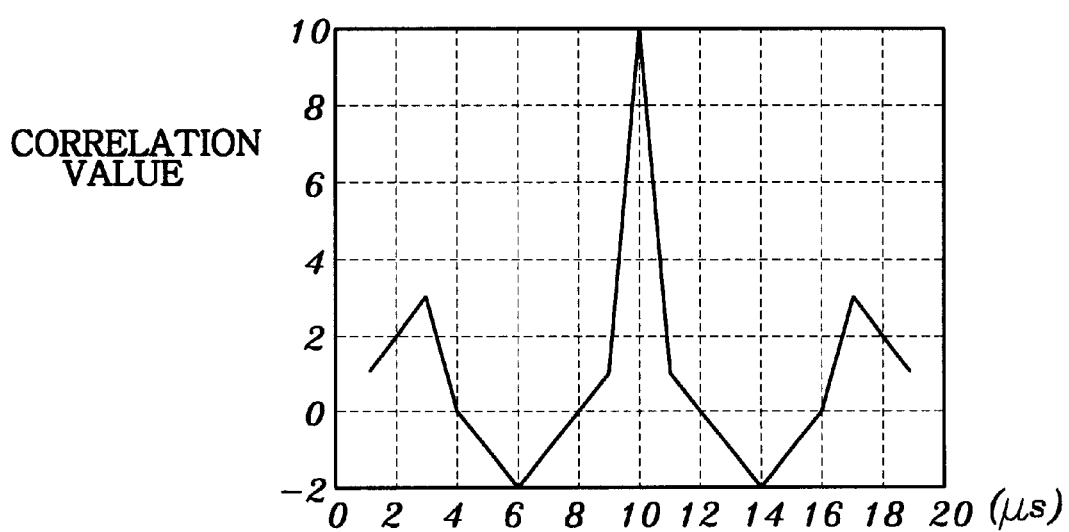
FIG. 7 represents a graph of correlation values of access codes when the synchronization of the received time is achieved.

FIG. 7 represents correlation values of access codes for $N_p=10$ when the synchronization of the received time is achieved to a GAC access code employing "0x928b33" as depicted in FIG. 6. Since "0X" represents a hexadecimal numbering system. "0x928b33" indicates an optional hexadecimal number which is used for the GAC access code.

The channel estimation circuit 543 in the channel distortion compensation circuit 540 uses the detected access codes provided from the correlation detection circuit 530 in which the synchronization of the received time thereof is achieved and calculates a minimum channel distortion compensation value $\bar{d}^0$ to be provided as the channel distortion compensation signal by employing information on $(N_f-N_p)$ bits. From now on, the calculation procedure of the minimum channel distortion compensation value $\bar{d}^0$ will be described in detail.

The access codes (i.e., CAC, DAC and GAC) previously known by the Bluetooth system can be represented as a'(n), which is defined as follows:

$$\{a'(n)=\pm 1 | n=0,1,2 \ldots, N_f-1\}$$

wherein $N_f$ represents a length of the access codes. By re-modulating the previously known access codes, an ideal signal m'(n) can be expressed as follows:

$$m'(n) = \frac{\sqrt{2E}}{T} e^{j\phi(nT, \overline{a}')}$$

wherein $$\phi(n, \overline{a}') = 2\pi h \int_{-\infty}^{nT} g(\tau) d\tau.$$

This signal m' (n) is used as a reference signal for a channel distortion compensation therein.

Meanwhile, s(k) can be represented as follows under the assumption that the sampling time is correct:

$$S(k) = m(kT)c(kT) + n(kT)$$

$$= \sqrt{(A^2(kT) + B^2(kT))} e^{j\tan^{-1}\frac{B(kT)}{A(kT)}}$$

Figure 9:
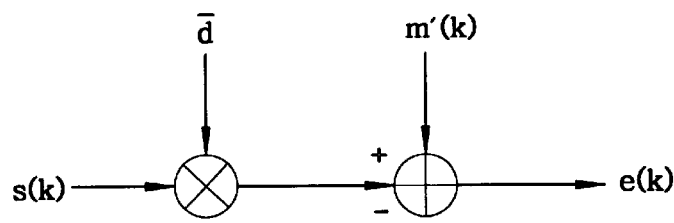
FIG. 9 depicts a channel modeling of the Bluetooth system in accordance with a preferred embodiment of the present invention.

FIG. 9 depicts a channel modeling of the Bluetooth system in accordance with a preferred embodiment of the present invention. The channel modeling of FIG. 9 can be used as an equivalent circuit for the channel distortion compensation apparatus 500. The e(k) of FIG. 9 can be expressed as follows:

$$e(k) = s(k)\overline{d} + m'(k), k = N_p, N_p+1, \ldots N_f-1,$$

wherein $\overline{d}$ represents an estimated channel coefficient; e(k) an error term due to the imperfect channel distortion compensation. By adopting a simple least-squares (LS) algorithm, a performance index $I(\overline{d})$ can be expressed as follows:

$$I(\overline{d}) = \sum_{k=N_p}^{N_f-1} |e(k)| = \sum_{k=N_p}^{N_f-1} |m'(k) - s(k)\overline{d}|^2$$

$$= \sum_{k=N_p}^{N_f-1} (m'(k) - s(k)\overline{d})^* (m'(k) - s(k)\overline{d})$$

$$= \sum_{k=N_p}^{N_f-1} (m'(k))^* m'(k) - \overline{d}^* \sum_{k=N_p}^{N_f-1} m'(k) s^*(k) - \sum_{k=N_p}^{N_f-1} (m'(k))^* s(k) +$$

$$\overline{d}^* \sum_{k=N_p}^{N_f-1} s^*(k) s(k) \overline{d}$$

$$= \sum_{k=N_p}^{N_f-1} (m'(k))^* m'(k) - 2\text{Re}\{\overline{d}^* \overline{P}\} + \overline{d}^* \overline{R}\overline{d}$$

wherein * represents a conjugate complex; and $\overline{P}$ and $\overline{R}$ are represented as follows:

$$\overline{P} = \sum_{k=0}^{N_f-1} s(k)^* m'(k);$$

$$\overline{R} = \sum_{k=0}^{N_f-1} s(k)^* s(k).$$

The performance index $I(\overline{d})$ is an Euclidean norm of an error vector e, which can be expressed by:

$$I(\overline{d}) = e^H e = (m' - s\overline{d})^H (m' - s\overline{d})$$

$$= m'^H m' - m'^H s\overline{d} - \overline{d}^* s^H + \overline{d}^* s^H s\overline{d}$$

wherein s is a vector of received signals and an exponent H denotes a conjugate transpose (Hermitian). The LS optimization involves the minimization of $I(\overline{d})$ and the value of $\overline{d}$ that minimizes $I(\overline{d})$ is $\overline{d}^0 = (s^H s)^{-1} S^H m'$, which results in the LS error $I(\overline{d}^0)_{min} = m'^H m' - m'^H s\overline{d}^0$. The vector of received signals can be expressed as:

$$s = mc(t_c) + n,$$

wherein $c(t_c)$ represents a channel distortion in the beginning of the receiving mode of the Bluetooth system. Under the assumption of the perfect synchronization, the $\overline{d}^0$ can be written by:

$$\overline{d}^0 = \frac{c^*(t_c) m^H m + n^H m'}{|c(t_c)|^2 m^H m + 2\text{Re}\{c^*(t_c) m^H n\} + n^H n}$$

wherein m is a GFSK modulated vector; m' is a re-modulated vector.

The value $\overline{d}^0$ is fed to the multiplier 510 as the channel compensation signal. The multiplier 510 multiplies $\overline{d}^0$ with the s(t) to thereby compensate an amplitude and a phase of the s(t). The multiplied signal from the multiplier 510 can be expressed as follows:

$$s(t)\overline{d}^0 = (m(t)c(t_c) + n(t)) \frac{c^*(t_c) m^H m' + n^H m'}{|c(t_c)|^2 m^H m + 2\text{Re}\{c^*(t_c) m^H n\} + n^H n}$$

$$= \frac{|c^*(t_c)|^2 m(t) m^H m + \{(m(t)c(t_c) n^H m\} + n(t)\{c^*(t_c) m^H m' + n^H m'\}}{|c(t_c)|^2 m^H m + 2\text{Re}\{c^*(t_c) m^H n\} + n^H n}$$

wherein the channel is assumed to be fixed at a slot; $t_c$ represents a start time of the slot; and the time t represents the end of the slot, $(t_c+72)\mu s \leq t \leq (t_c 625)\mu s$. As described in the above, to obtain a precise receiving information, only $(N_f - N_p)$ bits among 72 access codes as shown in FIG. 4 are used. If there is no noise and only a channel distortion exists, $\overline{d}^0$ will be $1/(c(t_c))$.

Figure 8:
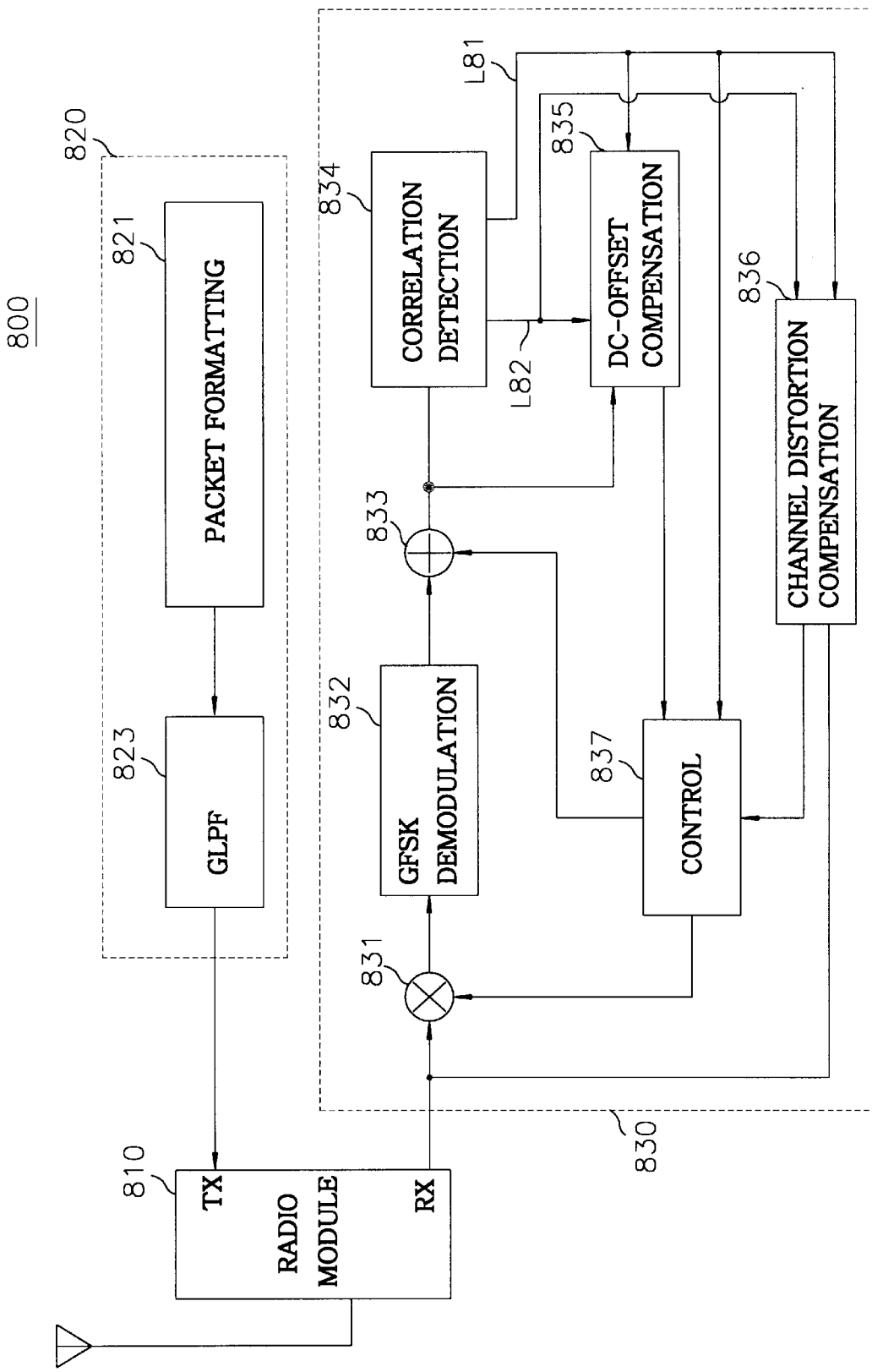
FIG. 8 presents a block diagram of a Bluetooth system having channel compensation function and DC-offset compensation function in accordance with the preferred embodiment of the present invention.

Meanwhile, FIG. 8 presents a block diagram of a Bluetooth system 800 having channel compensation function and DC-offset compensation function in accordance with a preferred embodiment of the present invention. The Bluetooth system 800 comprises a radio module 810, a transmitting channel 820 and a receiving channel 830. The radio module 810 enables a wireless communication between the Bluetooth system 800 and another Bluetooth system (not shown). The radio module 810 transmits information from the transmitting channel 820; and receives information from another Bluetooth system and then provides the same to the receiving channel 830.

The transmitting channel 820 includes a packet formatting circuit 821 and a Gaussian low pass filter (GLPF) 823. The packet formatting circuit 821 applies an FEC on the information to be transmitted to thereby form a packet and then provide the packet to the Gaussian low pass filter (GLPF) 823. The Gaussian low pass filter (GLPF) 823 filters the packet to thereby provide the filtered packet to the radio module 810.

The receiving channel 830 includes a multiplier 831, a GFSK demodulator 832, a subtracter 833, a correlation detection circuit 834, a direct current (DC) offset compensation circuit 835, a channel distortion compensation circuit 836 and a control circuit 837.

The multiplier 831 multiplies a GFSK signal S(t) from the radio module 810 with a channel distortion compensation value $\bar{d}^0$ from the control circuit 837 to thereby provide a multiplied signal to the GFSK demodulation circuit 832. The output of the GFSK demodulator 832 is fed to the subtracter 833. The subtracter 833 subtracts a DC-offset compensated value from the output of the GFSK demodulator 832 to thereby supply a subtracted value to the correlation detection circuit 834 and the DC-offset compensation circuit 835.

The structure and function of the correlation detection circuit 834 is the same as those of the correlation detection circuit 530 shown in FIG. 5. Accordingly, for simplicity, the description for the structure and function thereof is omitted. The correlation detection circuit 834 -generates an enable signal on a line L81 and detected access codes on a line L82, respectively.

The DC-offset compensation circuit 835, in response to the enable signal, performs DC-offset compensation by using the subtracted signal from the subtracter 833 and the detected access codes to thereby provide a DC-offset compensation signal to the control circuit 837.

The channel distortion compensation circuit 836, in response to the enable signal, performs channel distortion compensation by using the S(t) from the radio module 810 and the detected access codes from the correlation detection circuit 834 to thereby supply a channel distortion compensation signal to the control circuit 837. The structure and function of the channel compensation circuit 836 is the same as those of the channel compensation circuit 540 shown in FIG. 5. Accordingly, for simplicity, the description for the structure and function thereof is omitted.

The control circuit 837, in response to the enable signal, provides the DC-offset compensation signal and the channel distortion compensation signal to the subtracter 833 and the multiplier 831, respectively.

Figure 10:
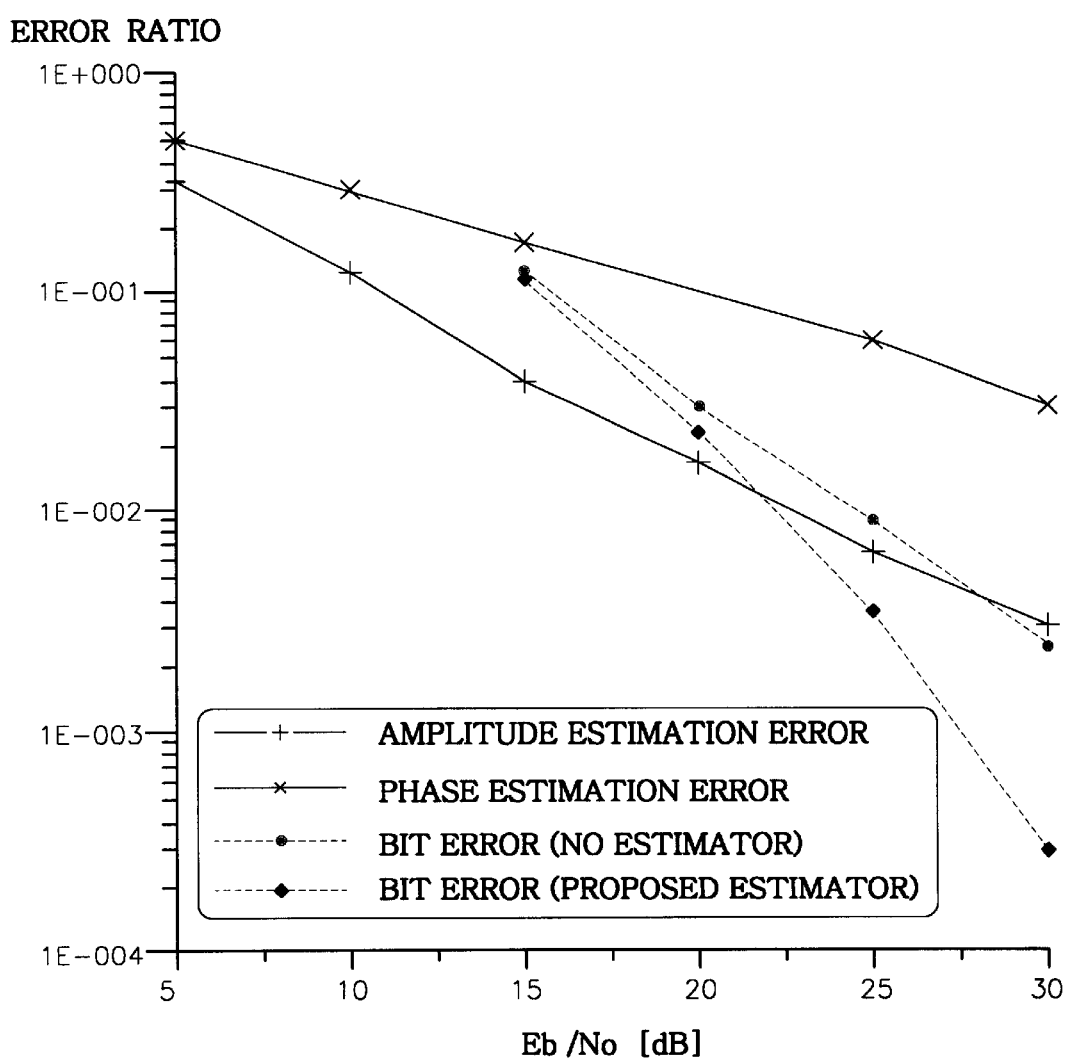
FIG. 10 depicts an experimental result as a bit error probability (BEP) of the capability of the channel distortion compensation apparatus in accordance with a preferred embodiment of the present invention.

FIG. 10 depicts an experimental result as a bit error probability (BEP) of the capability of the channel distortion compensation apparatus 500 in accordance with a preferred embodiment of the present invention. The result of FIG. 10 has been obtained under the condition that an rms delay spread is 70 ns; a maximum power delay spread is 200 ns; and a constant channel in one slot of 625 $\mu$s in a Bluetooth system model is adapted with a dilatory channel change. As shown in FIG. 10, the channel distortion compensation apparatus 500 obtains gains of about 1.5 dB and 5 dB at BERs $10^{-2}$ and $10^{-3}$, respectively.

In FIG. 10, solid lines marked with X and + represent graphs of a phase estimation error and an amplitude estimation error, respectively; a dot line marked with small black circles represents a graph of a bit error with no channel compensation; and a dot line marked with small black rectangular circles represents a graph of a bit error with a channel compensation of the present invention.

While the present invention has been described with respect to certain preferred embodiments only, other modifications and variations may be made without departing from the scope and spirit of the present invention as set forth in the following claims.

What is claimed is:

1. An apparatus for compensating a channel distortion in a Bluetooth system to process a received signal having access codes, comprising:

means for multiplying the received signal by a previously obtained channel distortion compensation signal to thereby provide a multiplied signal;

means for demodulating access codes of the multiplied signal to thereby output demodulated received access codes as a demodulated signal;

means for detecting correlation values between the demodulated received access codes and the access codes of the received signal previously stored therein to detect a start point of the received signal, thereby providing detected access codes having corresponding correlation values greater than a predetermined threshold and providing an enable signal if there are one or more correlation values greater than the predetermined threshold; and means, in response to the enable signal, for performing a channel distortion compensation based on the detected access codes and a reference signal obtained by re-modulating the access codes of the received signal to thereby provide a channel distortion compensation signal.

2. The apparatus of claim 1, wherein said correlation value detection means includes:

an access code storing circuit for storing plurality of access codes; and a pre-sliding correlator for detecting the correlation values between access codes corresponding to a certain uncertainty region of the demodulated received access codes and the access codes of the received signal previously stored therein and then providing the demodulated received access codes and the enable signal if there are one or more correlation values greater than the predetermined threshold.

3. The apparatus of claim 2, wherein said channel distortion compensation means includes:

a re-modulation circuit, in response to the enable signal, for re-modulating the access codes of the received signal to thereby provide re-modulated access codes as a reference signal; and a channel estimation circuit for carrying out channel estimation based on the received signal and the reference signal to thereby provide the channel distortion compensation signal.

4. The apparatus of claim 2, wherein said pre-sliding correlator uses $N_p$ number of the demodulated received access codes among $N_f$ number of the demodulated received access codes to detect a receiving time of the received signal precisely, $N_p$ being less than $N_f$.

5. The apparatus of claim 3, wherein said channel estimation circuit uses the detected access codes in which the synchronization of the received time thereof is achieved and calculates a minimum channel distortion compensation value $\bar{d}^0$ to be provided as the channel distortion compensation signal by employing information of $(N_f-N_p)$ bits.

6. The apparatus of claim 5, wherein said $\bar{d}^0$ can be obtained as follows under the assumption of the perfect synchronization:

$$\bar{d}^o = \frac{c^*(t_c)m^H m + n^H m'}{|c(t_c)|^2 m^H m + 2\,Re\{c^*(t_c)m^H n\} + n^H n}$$

wherein * represents a conjugate complex; an exponent H denotes a conjugate transpose (Hermitian); $c(t_c)$ represents a channel distortion in the beginning of the receiving mode of the Bluetooth system; m is a GFSK modulated vector; m' is a re-modulated vector; and n is an additive white Gaussian noise.

* * * * *